(12) United States Patent
Smashey

(10) Patent No.: US 6,213,192 B1
(45) Date of Patent: *Apr. 10, 2001

(54) LARGE STRUCTURAL, THIN-WALL CASTINGS MADE OF METALS SUBJECT TO HOT TEARING, AND THEIR FABRICATION

(75) Inventor: Russell W. Smashey, Loveland, OH (US)

(73) Assignee: General Electric Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,830

(22) Filed: Dec. 15, 1998

(51) Int. Cl.$^7$ ............................ B22D 25/00; B22D 27/04
(52) U.S. Cl. ................................. 164/122.1; 164/122.2; 164/361
(58) Field of Search ............................ 164/122.1, 122.2, 164/361

(56) References Cited

U.S. PATENT DOCUMENTS

| | | | | |
|---|---|---|---|---|
| 4,935,072 | * | 6/1990 | Nguyen-Dinh | 148/162 |
| 5,297,615 | | 3/1994 | Aimone et al. | 164/519 |
| 5,320,487 | * | 6/1994 | Walker et al. | 415/173.3 |
| 5,374,319 | * | 12/1994 | Stueber et al. | 148/404 |

* cited by examiner

*Primary Examiner*—Kuang Y. Lin
(74) *Attorney, Agent, or Firm*—Andrew C. Hess; David L. Narciso

(57) ABSTRACT

An article, such as a gas turbine engine mixer, is made by providing a mold structure defining a thin-walled, hollow article, and a base metal that is subject to hot tear cracking when cast in a generally equiaxed polycrystalline form, such as Rene' 108 and Mar-M247. The article is fabricated by introducing the molten base metal into the mold structure, and directionally solidifying the base metal in the mold structure to form a directionally oriented structure. The directionally oriented structure may be formed of a single grain or oriented multiple grains.

7 Claims, 3 Drawing Sheets

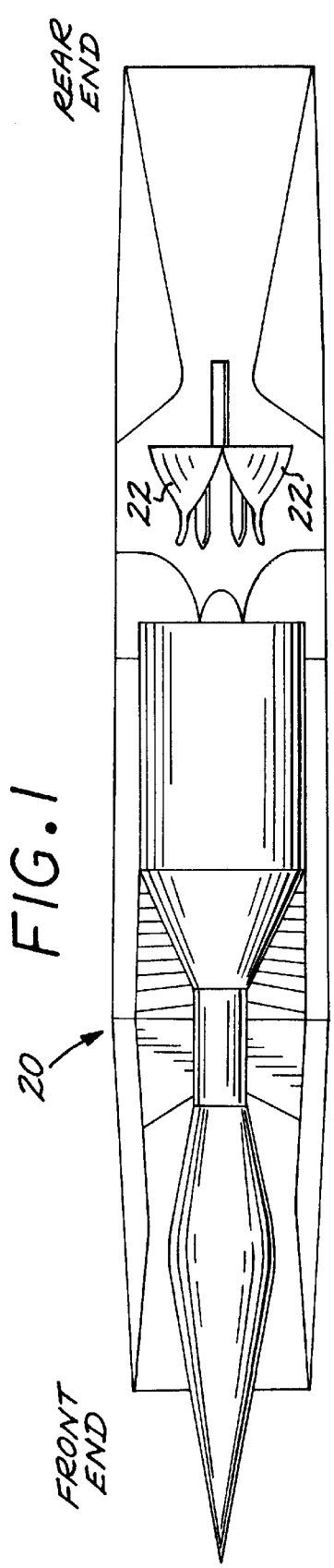
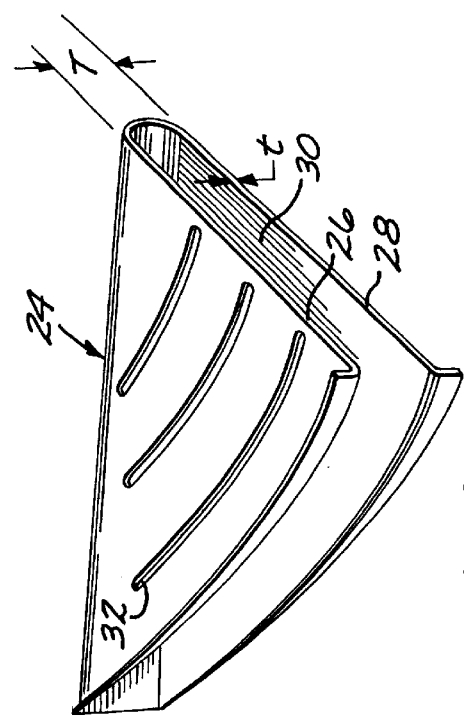
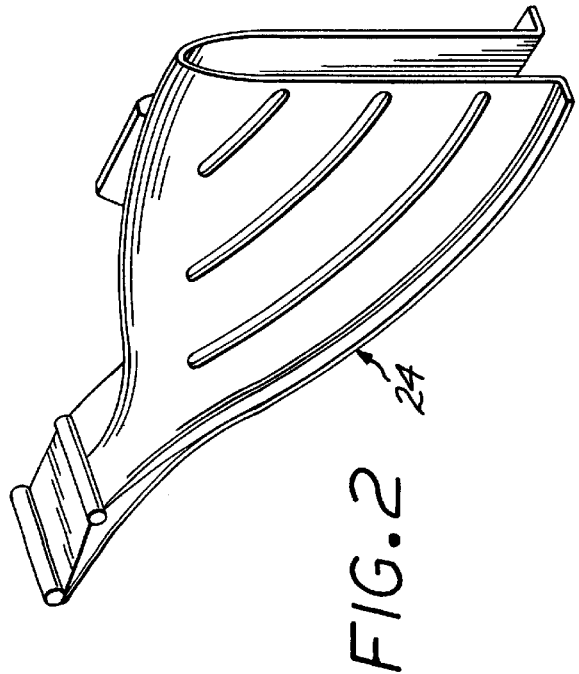
FIG. 1
FIG. 3
FIG. 2

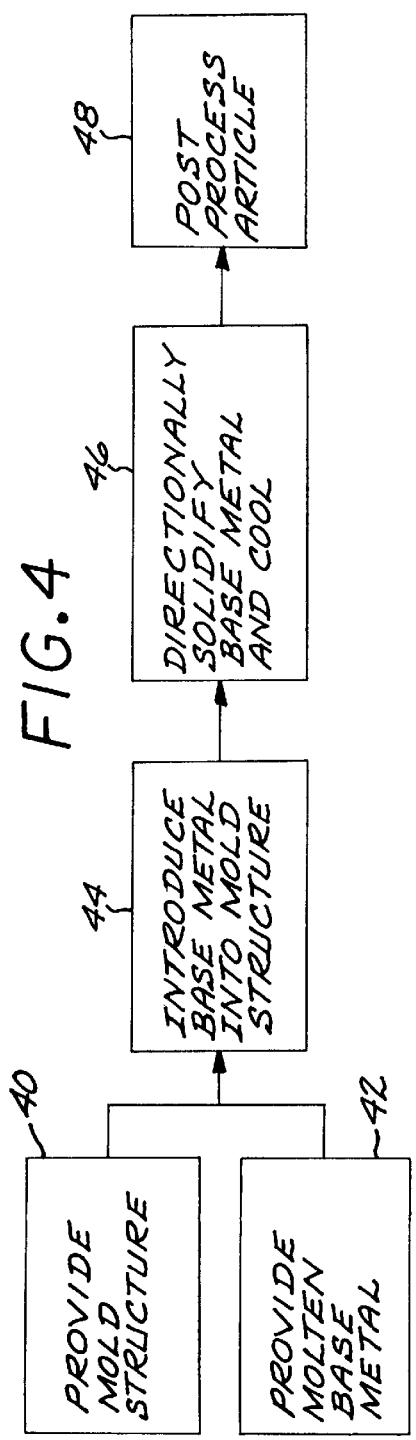
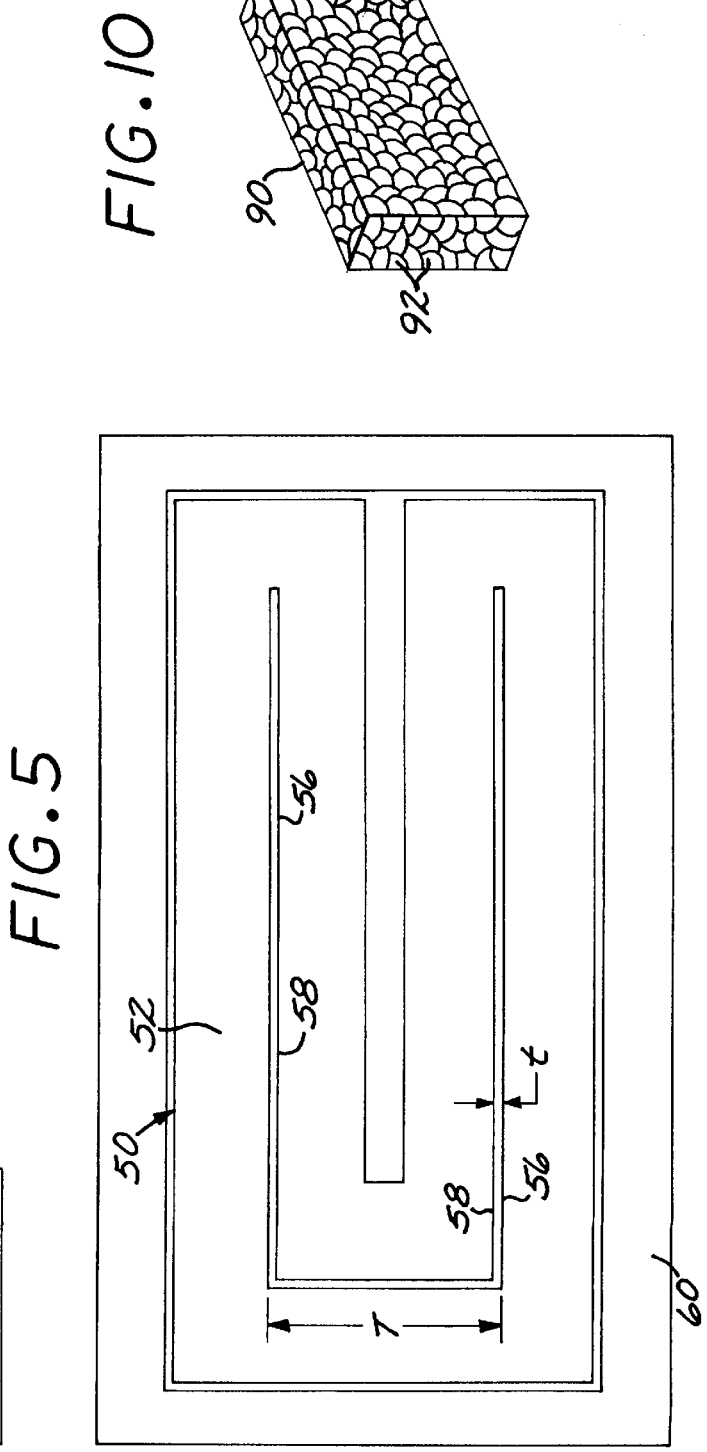

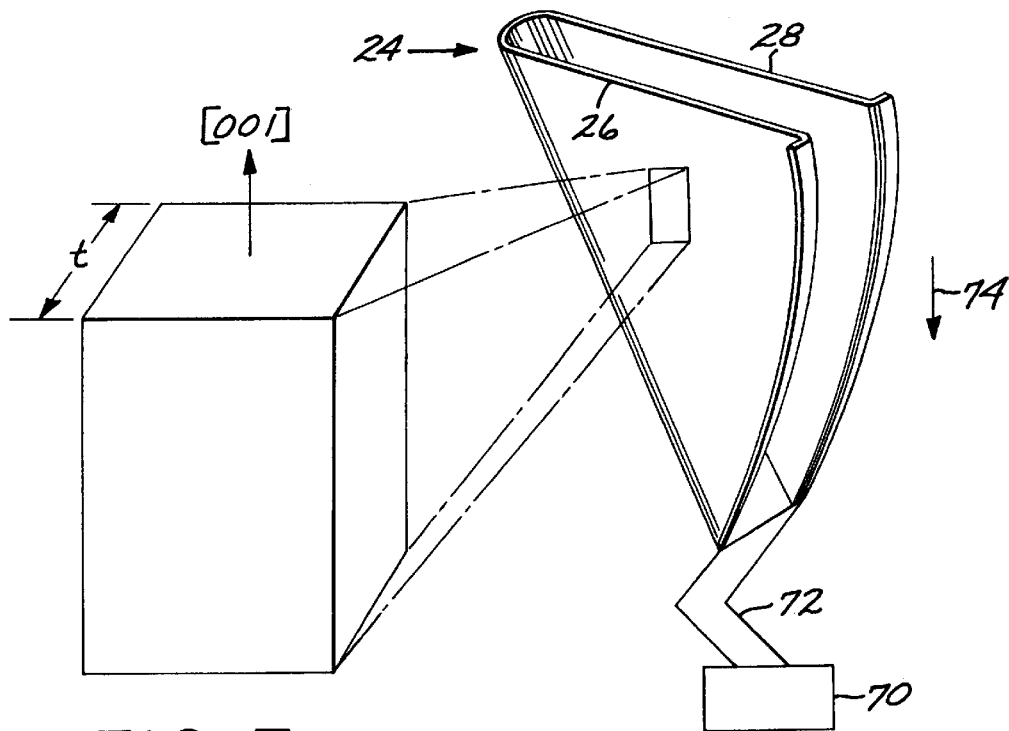
FIG. 7
FIG. 6
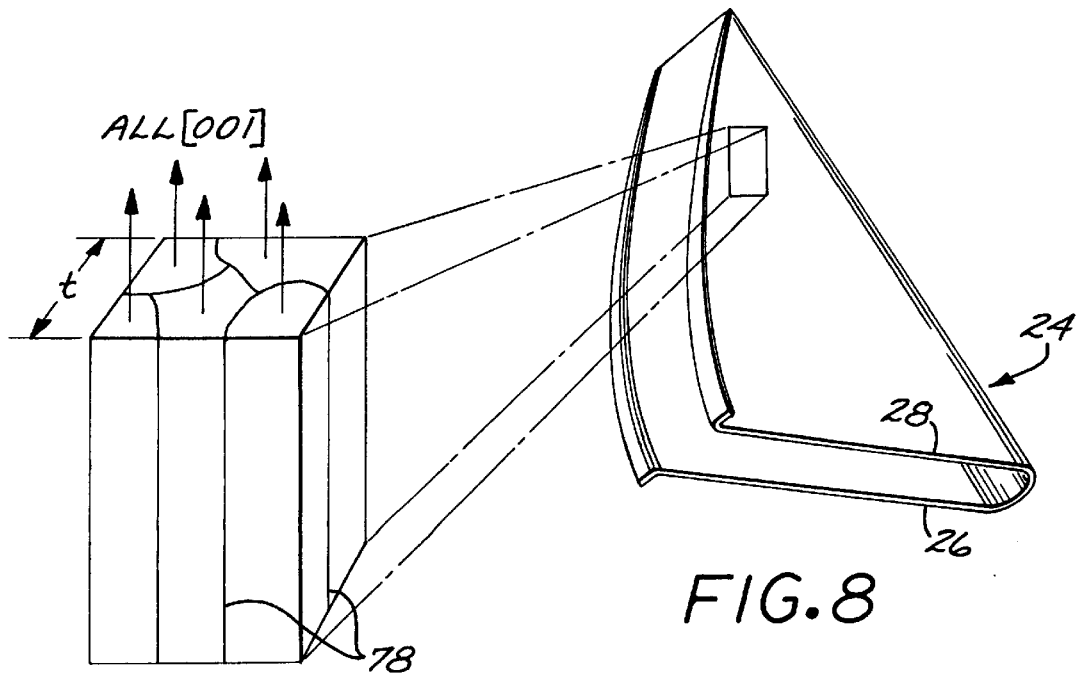
FIG. 9
FIG. 8

LARGE STRUCTURAL, THIN-WALL CASTINGS MADE OF METALS SUBJECT TO HOT TEARING, AND THEIR FABRICATION

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to the casting of metals to make thin-wall articles, and, more particularly, to the casting of such articles using metals which are subject to hot tearing.

Many articles are made by casting molten metal into a mold that closely defines the final shape of the article, and solidifying the molten metal in the mold. The solidified metal may need some final processing such as consolidating, crack repairing, cleaning, and/or final machining, but its gross as-cast shape is that of the desired final article.

This casting process is sometimes used because, for some metals, there is no practical alternative. These same metals have such low ductilities, even at elevated temperatures, that they cannot be fabricated by conventional metal working procedures. One casting application is the fabrication of parts used in the high-temperature portions of gas turbine (jet) engines. An example of such an article is the mixer used in some gas turbine engines to mix ambient air with exhaust gas.

Some of the metal alloys that would be desirably used in these castings are subject to hot tearing when cast by conventional procedures. Two examples are the nickel-base superalloys Rene' 108 and Mar-M247. These metals are qualitatively different from other nickel-base superalloys, in that they exhibit low grain boundary ductilities in the range from below the solidus temperature (about 2434° F. in these alloys) down to about 2100° F., as well as low polycrystalline grain boundary strengths in this same temperature range. During the cooling through this temperature range that follows casting of the molten metal and initial solidification, differential strains caused by the difference in thermal expansion coefficient between the metal and the surrounding casting shell mold create large differential stresses within the metal and cause grain boundary (intergranular) cracks to open. This cracking phenomenon is termed "hot tearing". The hot-tearing cracks remain in the final article, in many cases causing it to be unacceptable and in other cases requiring expensive repair and reworking before the article is acceptable for service.

The problem is particularly troublesome when metals subject to hot tearing are used to cast large, thin-walled structural articles by conventional processes. Localized differential strains across the wall thickness may be quite large, and grain boundary hot tearing is often observed. One approach to alleviating the hot tearing and defects in the casting is to modify the composition of the alloy to improve grain boundary ductility, but then. the desirable final mechanical properties of the material would be lost as well.

There is a need for an operable approach to the casting of large, thin-walled and hollow articles made of metals that are subject to hot tearing. The present invention fulfills this need, and further provides related advantages.

SUMMARY OF THE INVENTION

The present invention provides a structural, thin-walled article made of a metal subject to hot tearing, and a method for its fabrication The wall of the article may be made quite thin, yet grain boundary hot tearing of the metal is minimized. The approach of the invention yields a high-quality final article with a well-controlled microstructure.

In accordance with the invention, an article is made by the steps of providing a mold structure defining an article having a first wall, an opposing second wall, and an interior space therebetween, and providing a molten base metal that is subject to hot tear cracking when cast as a non-directional structure. The approach further includes introducing the molten base metal into the mold structure, and directionally solidifying the base metal in the mold structure to form a directionally oriented structure.

The article may be described as hollow, although the wall need not be continuous around the periphery of the article. The invention is most beneficially applied when the walls are relatively thin. In one embodiment, the walls are less than about 2 percent of a total thickness of the article, and in another embodiment, the walls are less than about 0.100 inches thick. The mold structure for making such an article typically has an exterior mold wall that defines the outer surface of the article, and an interior mold wall that defines the inner surface of the article. A structure of particular interest to the inventor is a gas turbine engine mixer, but the invention is applicable to a wide variety of structures.

The base metal typically has a polycrystalline ductility of less than about 1 percent over the temperature range of from the solidus temperature (typically about 2434° F.) down to about 2100° F. Examples of such metal alloys subject to hot tearing, when cast in a non-directional form as a thin-wall, complexly shaped article, are the nickel-base superalloys Rene' 108 and Mar-M247.

The base metal alloy is directionally solidified to form a directionally oriented structure. The directional solidification may be performed to produce either a single crystal (monocrystal) or a directionally oriented polycrystal. In each case, the number of grain boundaries is reduced as compared with those found in generally equiaxed castings. In particular, the number of grain boundaries extending through the thickness of the walls is substantially reduced, to zero in some cases. The inventor has observed that the predominant failure mode in hot tearing of conventionally prepared, non-directional, fine-grained, generally equiaxed castings of the alloys subject to hot tearing is intergranular failure along grain boundaries extending through the thickness of the wall. By eliminating these failure paths, the incidence of failure by hot tearing is greatly reduced or eliminated.

The reason for the improvement in properties resulting from the present approach, as compared with the conventional approach, is believed to relate to the structure occurring at the solidifying interface. However, the operability and results obtained with the present invention are not dependent upon the correctness of the following possible explanation. The directional solidification process is a high gradient process, with a large ratio of G/R, where G is the temperature gradient at the solidifying front and R is the withdrawal rate of the casting from the furnace. Consequently, the gap between the all-solid and all-liquid regions of the solidifying casting is smaller than in conventional casting. This small gap effectively reduces the amount of constitutional supercooling at the solidifying interface, thereby reducing the amount of interdendritic and/or grain boundary segregation which contributes to reduced grain boundary strength and ductility as well as increased amounts of interdendritic and/or grain boundary porosity in conventional casting. During cooldown after solidification is complete, cracking tends to occur through the region of interdendritic segregation and grain boundary porosity in the conventional castings, but not in the castings produced by the present approach The present invention is practiced using directional casting equipment sufficiently large for the article to be prepared. In a typical case, the furnace surrounding the mold is stationary. Directional solidification is accomplished by lowering the mold containing the base metal of the casting, so that the metal cools and solidifies substantially unidirectionally.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic sectional view of a gas turbine engine indicating the location of the mixer racks;

FIG. 2 is a perspective view of a single mixer lobe used in the gas turbine engine of FIG. 1, showing its relation to the engine;

FIG. 3 is a perspective view of one lobe of the mixer of FIG. 1;

FIG. 4 is block flow diagram of a preferred approach for fabricating an article according to the invention;

FIG. 5 is a schematic top view of a mold structure for fabricating the mixer;

FIG. 6 is a schematic perspective view of a lobe of the mixer arranged for single-crystal directional solidification;

FIG. 7 is a schematic microstructural depiction of the result of single-crystal directional solidification;

FIG. 8 is a schematic perspective view of a lobe of the mixer arranged for oriented polycrystal solidification;

FIG. 9 is a schematic microstructural depiction of the result of oriented polycrystal solidification; and FIG. 10 is a schematic microstructural depiction of a thin wall formed of generally equiaxed fine polycrystals.

DETAILED DESCRIPTION OF THE INVENTION

FIG. 1 is a schematic view of a gas turbine engine 20, such as considered for use on the High Speed Civil Transport aircraft The engine 20 includes, as its rearward end, two mixer racks 22, each utilizing a number of mixer lobes 24 that are fabricated separately and thereafter joined together. The mixer rack 22, with the mixer lobes 24 pivoted inwardly into the hot exhaust gas stream, mixes ambient air with hot exhaust gases during takeoff of the aircraft to reduce engine noise. After takeoff, the mixer rack 22 is pivoted back to its flush position out of the hot gas stream.

FIG. 2 illustrates one of the mixer lobes 24 in external view. FIG. 3 depicts the structure of the mixer lobe 24 in greater detail. The mixer lobe 24 includes a first wall 26, an opposing second wall 28, and an interior space 30 therebetween. Tracks 32 for subsequently added vanes extending between adjacent mixer lobes 24 are cast into the surface of the mixer lobe 24. In the mixer lobe 24 designed for the High Speed Civil Transport, each wall 26 and 28 has a thickness t of about 0.080 inches, and the total thickness T of the lobe 24 is about 7 inches.

FIG. 4 is a block diagram depiction of a preferred approach for fabricating the mixer lobe 24. A mold structure is provided, numeral 40. The mold structure defines the shape of the cast article, and its character is selected according to the specific article to be cast, as is well known in the art. A mold structure 50 for casting the lobe 24 is schematically illustrated in FIG. 5. The mold structure 50 includes an external mold 52 that defines an outer surface 54 of the wall 26 or 28 Because the article has the spaced-apart walls 26 and 28, the mold structure 50 further includes an internal mold wall 56 that defines an inner surface 58 of the wall 26 or 28. The mold structure 50 is readily made by investing either a wax or SLA (Stereo Lithographic Apparatus) preformed pattern with a ceramic, and thereafter dissolving or burning out the pattern leaving a hollow ceramic shell. The mold is placed into a vertical furnace 60 maintained at a temperature above the liquidus temperature of the base metal alloy, filled with molten metal, and slowly withdrawn downwardly from the furnace 60 to accomplish directional solidification, as will be discussed subsequently.

The wall thickness t and the total thickness T of the article are indicated in FIGS. 3 and 5. The present invention is particularly beneficially applied to castings which may be described as thin wall, because the ratio t/T is less than about 0.02. (That is, the wall thickness t is less than about 2 percent of the total thickness T.) In another embodiment, the invention is applied to castings having a wall thickness of less than about 0.100 inches, and most preferably having a thickness of about 0.080 inches or less. In either case, it is difficult to cast metals subject to hot tearing in such thin sections using the conventional approach of introducing the metal into a mold so that it solidifies with a relatively fine-grained, generally equiaxed, non-directional structure. When the conventional approach is used, the metal typically hot tears as it is cooled from the solidus temperature.

A molten base metal is provided, numeral 42. The base metal is the metal that forms the article, here the mixer lobe 24. The base metal used in the present invention is one that has excellent mechanical properties for use in the article, but which, undesirably, is subject to hot tear cracking when conventionally cast as a fine-grained, generally equiaxed, non-directional structure. Only metals in this class may be used for the articles in question, because changes to the composition of the metal typically improve the resistance to hot tear cracking, but also adversely affect the mechanical properties so as to be less desirable for use in the particular application.

Hot tearing and alloys subject to hot tearing are a recognized metallurgical phenomenon. The Metals Handbook defines "hot tear" as "a fracture formed in a metal during solidification because of hindered contraction". "Hindered contraction" is, in turn, defined as "Contraction where the geometry will not permit a casting to contract in certain regions in keeping with the coefficient of expansion." Thin-walled cast sections exhibit this hindered contraction.

As discussed earlier, some metals are subject to hot tearing due to their low ductilities in the temperature range below the solidus temperature. Although the exact values may vary, in general a nickel-base superalloy having a ductility of less than about 1 (one) percent over the temperature range of from the solidus temperature (about 2434° F. for the nickel-base superalloys of interest) down to about 2100° F. may be subject to such hot tearing. Examples of such metals include the nickel-base superalloys Rene' 108 and Mar-M247. Rene' 108 has a nominal composition, in weight percent, of 9.4 percent cobalt, 8.2 percent chromium, 0.5 percent molybdenum, 9.5 percent tungsten, 3.2 percent tantalum, 5.6 percent aluminum, 0.7 percent titanium, 1.5 percent hafnium, 0.1 percent carbon, 0.015 percent boron, balance (about 62.9 percent) nickel. Mar-M247 has a nominal composition, in weight percent, of 10.3 percent cobalt, 84 percent chromium, 0.75 percent molybdenum, 9.9 percent tungsten, 3.1 percent tantalum, 5.5 percent aluminum, 1.0 percent titanium, 1.5 percent hafnium, 0.20 percent carbon, balance nickel.

The molten base metal is introduced into the mold structure 50, numeral 44. Typically, the molten base metal is poured into the mold structure 50.

The base metal is directionally solidified in the mold structure 50, numeral 46, to form a directionally oriented structure. The resulting directionally oriented structure may be either of two types, a substantially single crystal (sometimes termed "monocrystal") structure or an oriented polycrystal structure.

FIG. 6 illustrates the type of apparatus used to achieve a substantially single crystal structure, and FIG. 7 depicts the resulting single crystal structure. "Substantially" single crystal means that the structure is nearly entirely a single crystal, with no grain boundaries. A minor amount of grain boundary and other grains are permitted, however, particularly in confined regions. In the illustration, the substantially single crystal structure is grown from a grain nucleation and sort out block 70, through a grain constriction region 72. (Equivalently for the present purposes, a single crystal seed may be used to initiate single-crystal growth.) Such techniques are known in the art for other applications, although not for the thin-walled castings of the invention. The mold structure 52 containing the molten metal, the grain nucleation and sort out block 70, and the grain constriction region 72 are moved downwardly in the direction indicated by the arrow 74 as a unit, with the furnace (not shown) stationary. (Equivalently for the present purposes, the mold structure 50, the grain nucleation and sort out block 70, and the grain constriction region 72 may be stationary, and the furnace raised.) Solidification begins at the grain nucleation and sort out block 70, progresses through the grain constriction region 72, and continues into the molten base metal that becomes the final article.

By the time that the base metal of the article is solidifying, it solidifies as a single crystal, as indicated in FIG. 7 by the absence of grain boundaries. For the face-centered-cubic base metal alloys of most interest, the single grain is oriented with the [001] direction parallel to the direction of solidification (vertical in the illustration). Because there are no grains, there are no grain boundaries extending through the thickness of the wall, indicated by the wall thickness t in FIG. 7. The metal with [001] oriented grains has better ductility than does the polycrystalline metal of the same composition.

FIG. 8 illustrates the type of apparatus used to achieve an oriented polycrystalline structure, and FIG. 9 depicts the resulting relatively coarse polycrystalline structure. In this case, the mixer lobe 24 is directionally solidified in the inverted position relative to that shown in FIG. 6. There is a grain nucleation and sort out block 70 but no grain constriction region 72. As before, the mold containing the molten metal is lowered out of a furnace maintained at a temperature above the liquidus temperature of the base metal. Crystals of different orientations nucleate at the bottom of the mold, but after a short distance the crystals with the fastest-growing growth direction predominate. After that short distance, the structure becomes coarse polycrystalline with all crystals having the predominant growth direction, [001] in the case of the preferred base metals. As seen in FIG. 9, there are a relatively small number of coarse grains 78 in the wall of the casting, with the grain boundaries and [001] crystallographic direction of the metal oriented parallel to the growth direction. A relatively few grain boundaries penetrate through the thickness t of the wall, and these grain boundaries are aligned parallel to the maximum stress direction of the article by the solidification process. These grain boundaries provide a fracture path for hot tearing, and for this reason the single crystal structure of FIGS. 6–7 is preferred over that of FIGS. 8–9. Nevertheless, the oriented coarse polycrystalline structure of FIGS. 8–9 is a significant improvement over the non-oriented, generally equiaxed fine grain structure produced by conventional casting, as will be discussed in relation to FIG. 10.

After directional solidification 46, the now-solid article is cooled to room temperature and post processed as desired, numeral 48. Post processing may include, for example, consolidation by hot isostatic pressing or otherwise, crack repairing of any cracks that may be present, cleaning flash and casting residue, and/or final machining of details, fastener structure, and the like.

For comparison, FIG. 10 illustrates an idealized thin wall 90 having a generally equiaxed, fine grain microstructure with the grain crystallographic directions randomly oriented. Large numbers of fine grains are present, with grain boundaries 92 extending through the walls and oriented in all directions. Sound structures such as that depicted in FIG. 10 with wall thicknesses less than about 0.100 inches cannot be reliably produced by conventional casting of alloys subject to hot tearing, because hot tears develop through the fine-grained structure as the casting is cooled from the solidification temperature. Test results indicate that this conventional process cannot reliably be used to cast walls of less than about 0.100 inch thick in the mixer lobe 24 from the alloys subject to hot tearing, and that casting of walls 0.060 inch thick would be. extremely difficult.

Fifty-six percent scale mixer castings have been produced from Rene' 108 material, using the approach of the invention. These castings, which have a wall thickness of about 0.080 inches, demonstrate the complete elimination of hot tearing and interior solidification shrinkage porosity. Related observations indicate that walls as thin as about 0.050 inches may be cast by this approach. This thin a wall is beyond the capabilities of even the most advanced equiaxed polycrystalline casting processes now available.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of making an article, comprising the steps of
providing a mold structure defining an article having a first wall, an opposing second wall, and an interior space therebetween, the mold structure including an external mold defining an outer surface of the first wall and an internal mold defining an inner surface of the first wall, wherein a thickness of at least one of the first wall and the second wall is less than about 2 percent of a total thickness ot the article;
providing a molten base metal that is subject to hot tear cracking when cast as a non-directional structure;
introducing the molten base metal into the mold structure; and directionally solidifying the base metal in the mold structure to form a directionally oriented structure.

2. The method of claim 1, wherein a thickness of at least one of the first wall and the second wall is less than about 0.100 inches.

3. The method of claim 1, wherein the step of providing a mold structure includes the step of providing a mold structure defining a gas turbine engine mixer.

4. The method of claim 1, wherein the base metal is selected from the group consisting of Rene' 108 and Mar-M247.

5. The method of claim 1, wherein the step of directionally solidifying includes the step of directionally solidifying the base metal as an oriented polycrystal.

6. The method of claim 1, wherein the step of directionally solidifying includes the step of directionally solidifying the base metal as substantially a single crystal.

7. The method of claim 1, wherein the step of directionally solidifying includes the step of directionally solidifying the base metal in the mold structure with a solidification direction lying parallel to the outer surface of the wall.

* * * * *